United States Patent
Bakshi et al.

(10) Patent No.: US 8,815,396 B2
(45) Date of Patent: Aug. 26, 2014

(54) ABRASIVE PARTICLES COMPRISING NANO-SIZED SILICON CARBIDE PARTICLES SURFACE-COATED WITH SILICA, AND METHODS USING SAME

(75) Inventors: Abhaya K. Bakshi, Westford, MA (US); Isaac K. Cherian, Shrewsbury, MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 794 days.

(21) Appl. No.: 12/286,979

(22) Filed: Oct. 3, 2008

(65) Prior Publication Data

US 2009/0101625 A1   Apr. 23, 2009

Related U.S. Application Data

(60) Provisional application No. 60/997,935, filed on Oct. 5, 2007.

(51) Int. Cl.
*B32B 5/16* (2006.01)
*B24D 18/00* (2006.01)
*C09C 1/28* (2006.01)

(52) U.S. Cl.
USPC .............. 428/403; 51/307; 51/308; 428/404

(58) Field of Classification Search
USPC .................. 51/307, 308; 428/403–406
See application file for complete search history.

(56) References Cited

U.S. PATENT DOCUMENTS

| | | | |
|---|---|---|---|
| 4,249,913 A | 2/1981 | Johnson et al. | |
| 4,429,003 A | 1/1984 | Fredriksson et al. | |
| 4,959,113 A * | 9/1990 | Roberts | 216/89 |
| 4,997,461 A | 3/1991 | Markhoff-Matheny et al. | |
| 5,009,675 A | 4/1991 | Kunz et al. | |
| 5,042,991 A * | 8/1991 | Kunz et al. | 51/295 |
| 6,062,952 A * | 5/2000 | Robinson et al. | 451/41 |
| 6,139,763 A | 10/2000 | Ina et al. | |
| 6,365,520 B1 | 4/2002 | Rhoades et al. | |
| 6,527,817 B1 * | 3/2003 | Fang et al. | 51/307 |
| 6,726,990 B1 * | 4/2004 | Kumar et al. | 428/402 |
| 6,918,821 B2 | 7/2005 | Balijepalli et al. | |
| 2001/0045063 A1 * | 11/2001 | Kambe et al. | 51/308 |
| 2002/0111024 A1 | 8/2002 | Small et al. | |
| 2002/0111027 A1 | 8/2002 | Sachan et al. | |

(Continued)

FOREIGN PATENT DOCUMENTS

| AU | 2008308583 | 3/2012 |
|---|---|---|
| CA | 2700413 | 4/2009 |

(Continued)

OTHER PUBLICATIONS

Quanli et al, Effect of particle size on oxidation of silicon carbide powders, Ceramics International 33 (2007) 309-313, available online Dec. 28, 2005.*

(Continued)

*Primary Examiner* — Holly Le

(74) *Attorney, Agent, or Firm* — Mike W. Crosby; Abel Law Group, LLP

(57) ABSTRACT

Improved silicon carbide particles, improved silicon carbide abrasive particles, and abrasive slurry compositions for use chemical mechanical planarization (CMP) processes. The particles can comprise nano-sized silicon carbide particles, particularly silicon carbide particles having a surface chemistry similar to silica.

13 Claims, 4 Drawing Sheets

(56) References Cited

U.S. PATENT DOCUMENTS

| | | |
|---|---|---|
| 2003/0121214 A1 | 7/2003 | Ishibashi |
| 2003/0168627 A1 | 9/2003 | Singh et al. |
| 2004/0060502 A1 | 4/2004 | Singh |
| 2004/0132306 A1 | 7/2004 | Bellman et al. |
| 2004/0157535 A1 | 8/2004 | Chaneyalew |
| 2005/0008557 A1* | 1/2005 | Yadav et al. ............ 423/274 |
| 2007/0087667 A1 | 4/2007 | Laconto et al. |
| 2009/0101625 A1 | 4/2009 | Bakshi et al. |
| 2009/0104851 A1 | 4/2009 | Cherian et al. |
| 2009/0215269 A1 | 8/2009 | Boggs et al. |

FOREIGN PATENT DOCUMENTS

| | | |
|---|---|---|
| CN | 1222495 | 7/1999 |
| CN | 101821353 | 9/2010 |
| EP | 0387748 | 9/1990 |
| EP | 1006166 A | 6/2000 |
| EP | 2215175 | 8/2010 |
| GB | 526130 | 9/1940 |
| GB | 1247374 | 9/1971 |
| GB | 2401370 | 10/2004 |
| JP | 11-293231 | 10/1999 |
| JP | 2000-160139 A | 6/2000 |
| JP | 2001072479 | 3/2001 |
| JP | 2003321276 | 11/2003 |
| JP | 2004189576 | 7/2004 |
| JP | 2004-331887 | 11/2004 |
| JP | 2005-523574 | 8/2005 |
| JP | 2007-105833 | 4/2007 |
| JP | 2010540265 | 12/2010 |
| KR | 1019910006451 | 4/1991 |
| KR | 10-2000-0047799 | 7/2000 |
| KR | 101170030 | 8/2012 |
| WO | 01/32799 A1 | 5/2001 |
| WO | 03/072683 | 9/2003 |
| WO | 2004030041 | 4/2004 |
| WO | 2004096941 | 11/2004 |
| WO | WO-2004096733 | 11/2004 |
| WO | 2007041199 A2 | 4/2007 |
| WO | 2009046293 | 4/2009 |
| WO | 2009046296 | 4/2009 |

OTHER PUBLICATIONS

Dumm, Characterization of low-level, oversize particles in abrasive powders, KONA No. 23 (2005).*

Stover, Oxidation of ultrafine (Si-)SiC powders, J. of Mat. Sci., vol. 29, No. 14, 3791-3796 (1994), abstract.*

The Written Opinion for International Application No. PCT/US2008/078747 (9 pages), (2009).

Zhuxian Yang et al, "Periodic mesoporous organosilica mesophases are versatile precursors for the direst preparation of mesoporous silica/carbon composites, carbon and silicon carbide materials" Journal of Materials Chemistry, vol. 16, No. 33, Sep. 7, 2006, pp. 3417-3425, XP002511883, ISSN: 0959-9428.

European Article 94(3) Communication for Related European Application No. 08 835 177.0 dated Dec. 20, 2010.

International Search Report for Related International Application No. PCT/US2008/078747 (3 pages), dated Dec. 2009.

* cited by examiner

ABRASIVE PARTICLES COMPRISING NANO-SIZED SILICON CARBIDE PARTICLES SURFACE-COATED WITH SILICA, AND METHODS USING SAME

The present application claims the benefit of U.S. provisional application No. 60/997,935 filed Oct. 5, 2007, which is incorporated by reference herein in its entirety.

FIELD OF THE INVENTION

The present invention provides improved silicon carbide particles, particularly nano-sized silicon carbide particles, and more particularly silicon carbide particles having a surface chemistry similar to silica. In some embodiments, the silicon carbide particles find particular use as abrasive particles. The present invention also provides methods of making silicon carbide particles of the invention, chemical mechanical planarization compositions (CMP) comprising silicon carbide particles of the invention, and methods for planarizing and polishing a surface using the compositions.

BACKGROUND OF THE INVENTION

Abrasive slurries are two-phase systems or dispersions of abrasive particles in liquid(s). Various types of abrasive slurries can be used in machining operations including wire saw slicing, polishing, and planarizing of various materials such as silicon, sapphire, silicon carbide, aluminum, glass, metals, and various ceramics.

Polishing and planarizing processes including Chemical Mechanical Polishing ("CMP") are surface smoothing and material removal processes that combines chemical and mechanical interactions. In general, the workpiece surface is pressed against a rotating polishing pad, while an abrasive slurry is provided between the surface and the pad. Most of the abrasive slurries used in such cases typically comprise a solid-liquid dispersion system of fine abrasive particles dispersed in an aqueous solution. It is also typical to include in the slurry, in addition to the abrasive, other additives including oxidizing agents, (such as hydrogen peroxide, ferric nitrate, potassium iodate and the like); corrosion inhibitors such as benzotriazole; cleaning agents and surface active agents. In CMP slurries, the abrasive powder provides for mechanical action, while the aqueous solution typically contains reactive chemical agents for chemical action. In general, the abrasive powder abrades the surface to remove protrusions and irregularities in the workpiece surface. The reactive chemical agents provide various functions such as reacting with and/or weakening the material to be removed, aiding in the dissolution of the mechanically removed material by dissolving it into solution, and oxidizing the surface layers to form a protective oxide layer. In many cases, such as slurries involving colloidal silica and ceria particles, the abrasive particles also react with the substrate surfaces to soften the top layer. The polishing pad helps to remove the reacted and abraded materials from the surface. In this way, CMP can be used to flatten and smooth a workpiece to very high levels of local and global planarity.

CMP has been found to be a particularly enabling technology for providing the smooth topographies and uniform thicknesses required in the formation of semiconductor devices. Rapid advances in the semiconductor device industry call for continued increases in wire density and decreases in device size. With these advances, planarization and polishing of the various semiconductor component surfaces becomes more and more critical. Semiconductor devices are typically made by depositing a metal such as copper in spaces between non-conductive structures and then removing the metal layer until the non-conductive structure is exposed and the spaces between remain occupied by the metal. The demands placed on the abrasive are in many ways in conflict. It must remove the metal but preferably not the non-conductive material. It must remove efficiently but not so quickly that the process cannot be terminated when the desired level of removal has been reached.

Many materials requiring planarization and polishing are difficult to polish due to hardness and/or resistance to chemical attack. For example, sapphire ($Al_2O_3$), which has been used in forming semiconductor device, is a hard and strong material that transmits ultraviolet, visible, infrared and microwaves, is chemically inert, insoluble in most common industrial solutions, and corrosion resistant, and has low dielectric constant and high thermal conductivity. However, due to sapphire's hardness and resistance to chemical attack, polishing and planarizing sapphire presents many difficulties.

In the past, slurries containing aluminum oxide and silica abrasive particles have been used to polish materials, including sapphire wafers. Colloidal and fumed silicas are desirable for use in abrasive slurries because of their wide availability at a reasonable cost. These silicas further possess colloidal stability in aqueous solutions with a wide variety of chemistries. They also chemically react with the surface, which often enhances material removal. Because silica abrasives are relatively soft, they are capable of polishing a wide variety of surfaces while minimizing defects and scratching. However, the softness of silicas limits their polishing ability and results in low rates of material removal on many types of substrates, such as sapphire, which is hard and resistant to chemical attack. Ceria also provides similar properties for polishing, giving a very good chemical interaction with the substrate surface. However, ceria is often too soft to give adequate removal rate. To compensate for the low material removal rates of silica-containing slurries, harder abrasives are sometimes used. One such material is aluminum oxide. Aluminum oxide has been found to substantially increase removal rates compared with fumed and colloidal silicas in a wide variety of applications. However, it may not give similar chemical reaction which often a critical mechanism for polishing. Also, aluminum oxide cannot directly replace silica particles in applications where silica particles have been used because the surface chemistry of aluminum oxide is very different than that of silica. Specifically, silica has a negative zeta potential over a wide pH range (typically from around pH=2 and higher). Aluminum oxide, on the other hand, has a positive zeta potential over a wide pH range (typically from around pH=9 and lower). As a result, aluminum oxide tends to agglomerate under conditions where silica particles would be stable. Agglomeration decreases the performance of the slurry because it can cause scratching of the workpiece surface as well as uneven and unpredictable polishing rates. In addition, the different surface chemistry of aluminum oxide makes it incompatible with some chemistries used with silica-containing slurries. This can result in surface defects in the substrate if the dispersion is not carefully prepared based on the surface chemistry of aluminum oxide. Further, aluminum oxide is very aggressive such that it is very difficult to avoid "dishing", which is the formation of a depression in a metal layer lying between adjacent non-conductive material structures. Dishing adversely affects the performance of the semi-conductor and is therefore considered to be very undesirable.

Given these and other deficiencies observed in the art, it would be highly desirable to develop improved abrasive slurry compositions that provide fast removal rate while still minimizing defects and scratching.

SUMMARY OF THE INVENTION

This invention provides improved silicon carbide particles. These silicon carbide particles demonstrate properties that make them useful in a variety of applications. In certain embodiments, the silicon carbide particles are suitable for use as abrasive particles. The invention further provides abrasive slurry compositions that solve the deficiencies of conventional compositions. The present compositions greatly improve polishing and planarization performance and efficiency in planarizing and polishing a variety of surfaces. The present compositions reduce surface defects while attaining excellent planarity with high material removal rate.

In one aspect, the invention generally relates to nano-sized particles comprising silicon carbide.

Embodiments according to this aspect of the invention can include the following features. The silicon carbide particles can be in the form of abrasive particles. The silicon carbide particles can have a surface chemistry similar to silica. The silicon carbide particles can comprise particles having at least portions of their surfaces coated with silica such that the silicon carbide particles have a surface chemistry similar to silica. The silicon carbide particles can comprise particles having silica covering at least 50% of their surface, and in some embodiments, at least 80% of their surface. The silicon carbide particles can be substantially encapsulated by silica. The silicon carbide particles can have an average particle size of 400 nm or less, 300 nm or less, 200 nm or less, and 100 nm or less. The silica coating can be formed by oxidation of the silicon carbide particles. The oxidation can result in particles of silicon carbide comprising a silica coating having a particle size substantially the same as the particle size of the silicon carbide particles before oxidation. The silicon carbide can be nano-sized $\alpha$-silicon carbide. The silicon carbide can be $\beta$-silicon carbide.

In another aspect, the invention generally relates to an abrasive slurry composition comprising a dispersion of silicon carbide particles as set forth herein.

Embodiments according to this aspect of the invention can include the following features. The silicon carbide can be present in the aqueous medium at a concentration of at least about 0.01 wt %, in some embodiments at least about 0.1 wt %, and in some embodiments at least about 1 wt %. The silicon carbide can be present in the aqueous medium at a concentration ranging from about 5% to about 50%.

In another aspect, the invention generally relates to a method for making a particle comprising preparing nano-sized abrasive particles comprising silicon carbide.

Embodiments according to this aspect of the invention can include the following features. The particles can be abrasive particles. The silicon carbide particles can be prepared such that the silicon carbide particles have a surface chemistry similar to silica. The surface chemistry can be provided by oxidizing the silicon carbide. The particle size of the oxidized silicon carbide particles can be substantially the same as the particle size of the silicon carbide particles before oxidation. The silicon carbide particles can comprise $\alpha$-silicon carbide particles. The silicon carbide particles can comprise $\beta$-silicon carbide particles. The silicon carbide particles can be substantially encapsulated by silica. The silicon carbide particles can be prepared by reacting a mixture of silica and carbon at a temperature of at least 2000° C.

In another aspect, the invention generally relates to a method of chemical mechanical planarization (CMP) comprising abrading a substrate with an abrasive slurry composition comprising a dispersion of silicon carbide particles as set forth herein.

Embodiments according to this aspect of the invention can include the following features. The substrate can comprises a metal layer, and the metal layer is abraded. The metal layer can be a noble metal. The substrate can comprises an insulator layer, and the insulator is abraded. The insulator layer can contain silicate groups.

In another aspect, the invention generally relates to a method for increasing the removal rate and surface finish of a substrate, as compared to the removal rate and surface finish provided with a silica slurry under similar conditions, comprising providing a slurry comprising silica abrasive particles, and adding nano-sized abrasive particles comprising silicon carbide to the slurry. In some embodiments, the nano-size silicon carbide particles can have a surface chemistry similar to silica.

In another aspect, the invention generally relates to a method for increasing the removal rate and surface finish of a substrate comprising adding nano-sized abrasive particles comprising silicon carbide particles to a slurry comprising softer abrasive particles, wherein the removal rate and surface finish is increased compared to the slurry comprising softer abrasive particles without the silicon carbide particles. In some embodiments, the nano-size silicon carbide particles can have a surface chemistry similar to silica.

In another aspect, the invention generally relates to a method for increasing the chemical reaction and the hardness of a slurry comprising adding nano-sized abrasive particles comprising silicon carbide particles to the slurry, wherein the slurry comprises softer abrasive particles, wherein the chemical reaction and the hardness is increased compared to the slurry comprising softer abrasive particles without the silicon carbide particles. In some embodiments, the nano-size silicon carbide particles can have a surface chemistry similar to silica.

Other aspects and advantages of the invention will become apparent from the following description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DESCRIPTION

Figure 1A:
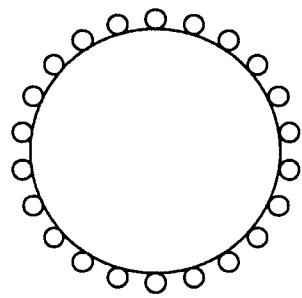
FIG. 1A shows a cross-section of a coated silicon carbide particle, wherein the coating is a particulate coating.

The particles provided by the present invention are suitable for use in a variety of applications. For example, the particles find particular use as abrasive particles. It is noted that while the particles may be described herein as abrasive particles and in connection with their use as abrasive particles, the particles are not limited to abrasive particles and such uses. In some embodiments, particles of the present invention are provided in slurry compositions, such as abrasive slurry compositions. The abrasive slurry compositions provided by the present invention are suitable for use in various polishing and planarization processes including CMP, pre-polishing step for stock removal, texturing, etc. Such processes can be used to polish and planarize the surfaces of various materials including the various layers in semiconductor devices. Some examples of semiconductor materials that the present slurries can be used to polish and planarize include sapphire ($Al_2O_3$), diamond (C), silicon (Si), germanium (Ge), silicon carbide (SiC), silicon germanide (SiGe), aluminum antimonide (AlSb), aluminum arsenide (AlAs), aluminum nitride (AlN), aluminum phosphide (AlP), boron nitride (BN), boron arsenide (BAs), gallium antimonide (GaSb), gallium arsenide (GaAs), gallium nitride (GaN), gallium phosphide (GaP), indium antimonide (InSb), inidium arsenide (InAs), indium nitride (InN), and indium phosphide (InP). Thus, the disclosure to follow should be construed as illustrative rather than in a limiting sense. For example, while certain combinations of materials and concentrations may be provided, such combinations of materials and concentrations are based on CMP processing of particular materials, and could be suitably modified for other types of processes and for polishing and planarizing various materials.

The particles of the present invention comprise nano-sized silicon carbide particles. In certain embodiments, the silicon carbide particles behave similarly to silica. For example, the silicon carbide particles can have a surface chemistry similar to silica such that the silicon carbide particles behave similarly to silica. As a result, when used in slurries, the particles are very compatible with all slurry chemistries formulated around silica particles such that the silicon carbide particles are easily dispersed in these slurry chemistries. In some embodiments, dispersion can be further facilitated by simply adjusting the pH as required (e.g., above the isoelectric point of the silicon carbide particles, e.g. pH=3.0). Thus, the present silicon carbide particles will tend to be stable under conditions where silica particles would be stable, resulting in decreased agglomeration.

In some embodiments, the surface chemistry is provided when forming the silicon carbide particles, particularly in the process of forming nano-sized α-silicon carbide. The nano-sized α-silicon carbide, as formed, exhibits a surface chemistry and an iso-electric point similar to silica. In particular, in some embodiments the silicon carbide of the present invention is nano-sized α-silicon carbide having a surface potential similar to silica, with an iso-electric point of about 2.2. The nano-sized α-silicon carbide particles can have a hexagonal crystal structure and will readily disperse at higher pH (see FIG. 3, wherein the particles remain dispersed at higher pH values, e.g. pH 8-12). Without wishing to be bound by theory, it is believed that such particles, to some extent, have silica on their surfaces, which provides these properties.

Figure 2:
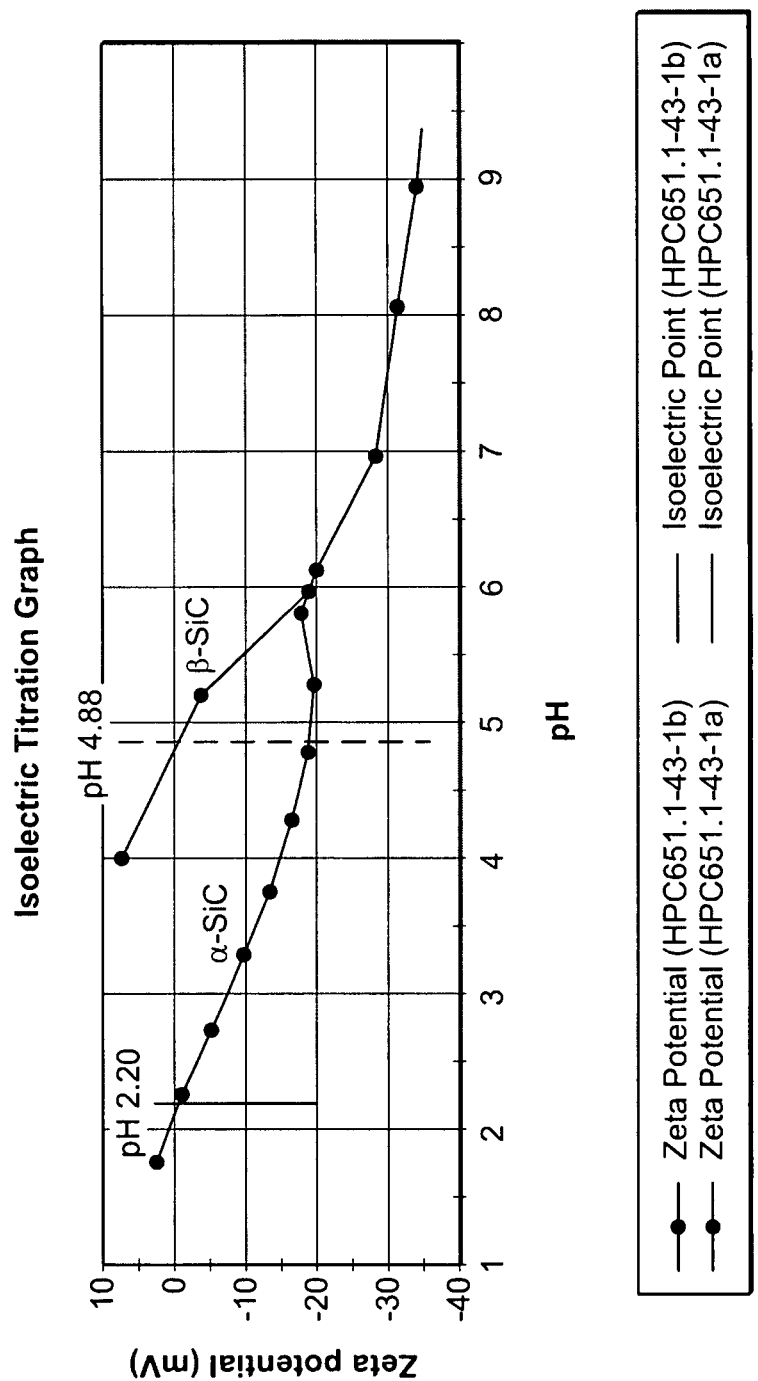
FIG. 2 shows the iso-electric points of $\alpha$-SiC and $\beta$-SiC nano-particles.
Figure 3:
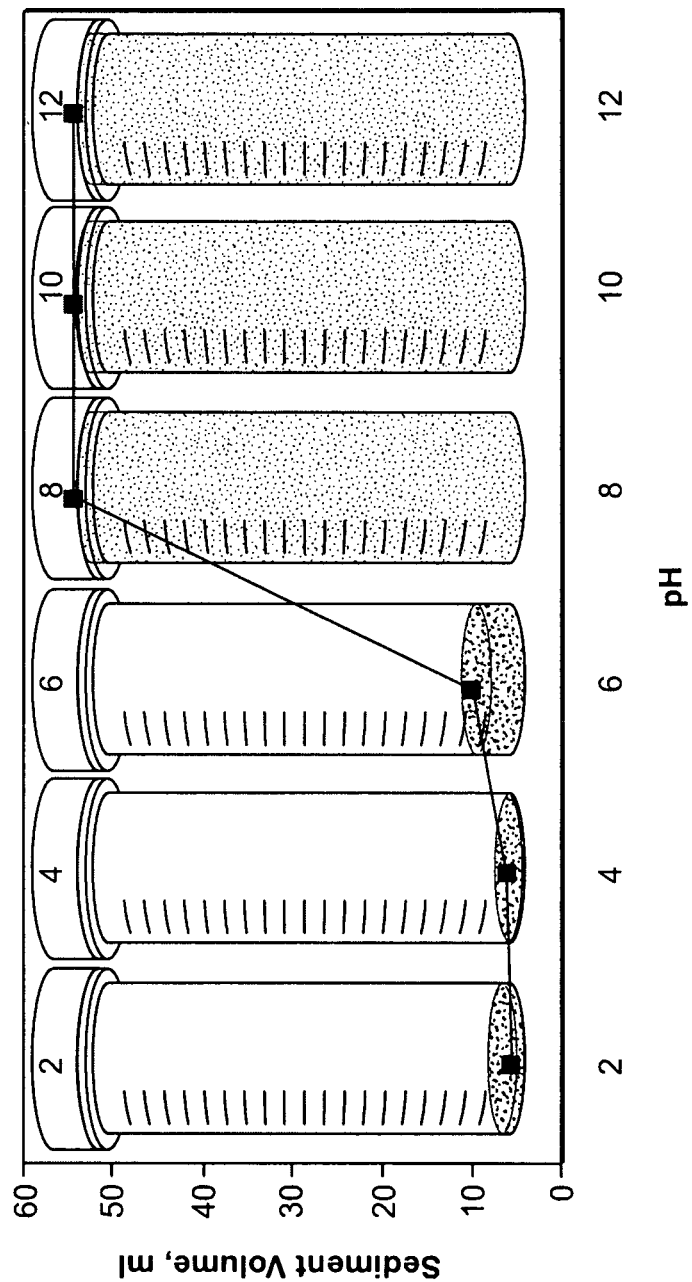
FIG. 3 shows the settling behavior of $\alpha$-SiC nano-particles.

In some embodiments, the silicon carbide particles are coated with silica, which provides the particles with a surface chemistry similar to or identical to silica. The coating can be provided by depositing a silica coating on the silicon carbide particles using compositions capable of providing a silica coating. In other embodiments, the coating is provided by oxidation of silicon carbide particles. In such embodiments, the silicon carbide can be α-silicon carbide or β-silicon carbide. The α-silicon carbide can initially have a surface chemistry similar to silica and can further be coated with silica using one of the above methods, or it can have a surface chemistry different than silica and can be coated with silica. In other embodiments, the silicon carbide is nano-sized β-silicon carbide which, generally, is the commercially available form of nano-sized silicon carbide. Commercially available β-silicon carbide tends to have a higher iso-electric point than nano-sized α-silicon carbide (as shown in FIG. 2). As such, commercially available β-silicon carbide will tend not to disperse, but rather will settle rather quickly over the range of pH values. For example, when compared to FIG. 3 showing the settling behavior of α-silicon carbide wherein α-silicon carbide remains dispersed at higher pH values, the β-silicon carbide settles for all pH values from 2-12. Such commercially available α-silicon carbide will also tend to agglomerate, which, for example, negatively impacts polishing. The nano-sized β-silicon carbide, such as those commercially available, is coated or oxidized to provide a surface potential/iso-electric point similar to silica.

The coating of silica can beneficially be provided so as to "soften" the silicon carbide particles, such that when used as abrasive particles, the coating thereby reduces defects and scratching normally associated with silicon carbide polished workpieces. Further, the oxidation reaction used to produce the coated particles of the present invention has further been found to "blunt" or reduce sharp corners of the silicon carbide particles, thereby further reducing defects and scratching of the polished workpiece. Further, the material removal rate of the coated particles is improved using the coated silicon carbide particles since the underlying core is hard and the particles have a higher density than typical silica particles.

Figure 1B:
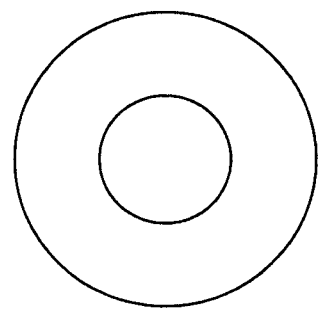
FIG. 1B shows a cross-section of a coated silicon carbide particle, wherein the coating is a film-like coating.

As used herein, a "coating", when referring to the silica coating of the silicon carbide abrasive particles, means generally that the silicon carbide particles have silica on at least a portion of their surface to an extent necessary to provide the silicon carbide particles with a surface chemistry similar to silica. The coating can be in the form of a particulate coating 2 of silica on a silicon carbide core 1 (e.g., see FIGS. 1A, 2B), a non-particulate, film-like coating 2 of silica on a silicon carbide core 1 (e.g., FIG. 1B), and combinations thereof. While FIGS. 1A and 1B show round particles, the principles shown in these figures apply also to irregular-shaped silicon carbide particles, with the silica coating provided on portions of the irregular-shaped particles or on the entire outer surface of the irregular-shaped particles. In some embodiments, at least about 50%, on average, of the surface of the particles is coated with silica. The amount of the surface of a given particle coated with silica can range from about 50% to about 100%, for example, at least about 60%, 70%, 80%, 90%, and 95%. The coating on a given particle can be uniform in thickness or, in some embodiments, it can vary in thickness on a given particle. Further, when used in slurries, the thickness of coatings on the particles in a slurry can be uniform or can vary among the particles in the slurry.

In some embodiments, the silicon carbide is formed by a method known as the Acheson process. In particular, a mixture of silica and carbon is reacted at a temperature generally in excess of 2000° C. to reach a maximum temperature around 2700° C. The overall reaction is shown as:

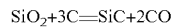

The mixture can further include sawdust to provide the mixture with porosity through which the carbon monoxide in the reaction can escape. Salt can be added to help purify the mixture. The reaction can take place, for example, in an electric furnace. Other known processes similar to the Acheson process can also be used to produce the silicon carbide.

In accordance with some embodiments of the present invention, coated silicon carbide particles are formed by oxidation of silicon carbide particles wherein the oxidation can include, for example, thermal oxidation, chemical oxidation, and combinations thereof. The oxidation reaction has been found to occur at the surface of the reactant particles. In general, the oxidation of silicon carbide, when carried out at suitable temperatures and durations, results in the conversion of silicon carbide, at the surface of the particles, to silica, thereby forming a "coating" or layer of silica at the surface of the particles. The conversion of silicon carbide to silica at the particle surface will result in a particle size of the "coated" silicon carbide that is approximately the same as that of the particle size of the silicon carbide starting material. In some embodiments, the particle size of a nanosized silicon carbide particle generally will not change by more than 15%. In some embodiments, the particle size of a nanosized silicon carbide particle generally will not change by more than 10-60 nm.

The specifics of silicon carbide oxidation are known, and the oxidation reaction of the present invention is in accordance with these known principles. Generally, during the oxidation of silicon carbide, Si and C are oxidized simultaneously. At sufficiently high $O_2$ pressures, the reaction is:

$$SiC(s) + 2O_2(g) \rightarrow SiO_2(s) + CO_2(g)$$

While at lower pressures, the reaction is:

$$SiC(s) + 3/2 O_2(g) \rightarrow SiO_2(s) + CO(g)$$

And at very low pressure, SiO (g) may also form as follows:

$$SiC(s) + O_2(g) \rightarrow SiO(s) + CO(g)$$

During the oxidation process, the $O_2$ diffuses in and reacts with the SiC at the interface and $CO_2$ and CO diffuses out. During thermal oxidation, the process is carried out at high temperatures typically between about 800 and 1200° C. The rate-determining step is the diffusion of $O_2$ in, and the reaction kinetics can be influenced, for example, by adjusting the particle size, with the reaction rate increasing with decreasing SiC particle size.

The amount of "coating" or the thickness of the silica layer can be measured, in accordance with the present invention, by measuring oxygen content in the oxidized particles. Coated particles of the present invention generally will have an oxygen content ranging from about 5 wt % to about 20 wt % based on total weight of the particle. The oxygen content can be adjusted by varying factors such as the temperature and duration of the reaction. At lower temperatures and shorter durations, the oxidation content will be less than at higher temperatures and longer durations. Further, the particle size of the starting silicon carbide particles will impact the oxygen content. As the particle size of the silicon carbide particles decreases, the oxygen content will increase at constant temperature and duration because the reaction rate is expected to increase. It has been found that excessive oxidation can result in an unacceptable reduction or elimination in the hardness property of the starting silicon carbide material. As such, the various factors that impact reaction rate and oxygen content in the coated particles should be monitored and controlled to provide desired oxygen content levels.

The oxidation process can provide "coatings" or layers on a given particle that are uniform in thickness or which can be thinner or thicker on various portions of the particle. Without being bound by theory, it is believed that the oxidation process may result in a non-uniform coating or layer of silica on the silicon carbide particles due to the non-isotropic structure of silicon carbide particles.

In some embodiments, commercially available silicon carbide particles comprising particles of non-uniform size are used. As a result, the oxidation of such commercially available particles will typically result in coated silicon carbide particles wherein some particles have a greater oxygen content, and, thus, a thicker coating or layer of silica, while other particles have a smaller oxygen content.

When the present silicon carbide particles are used as abrasive particles in abrasive slurry compositions, such compositions are particularly capable of providing smooth topographies and uniform thicknesses required in the formation of semiconductor devices. In accordance with the present invention, the rates of chemical and mechanical interaction are appropriately balanced to provide optimal polishing performance. It has been found that mechanical abrasion varies with abrasive particle size, abrasive particle concentration, and particle size distribution. Thus, the present slurry compositions comprise abrasive particles having suitable particle size, concentration, and particle size distribution to provide the appropriate levels of mechanical interaction. Further, the slurry compositions are used in a CMP process wherein the operational variables, such as applied pressure and velocity of the polishing pad, are controlled to provide the desired polishing and planarization properties.

In some embodiments, the abrasive slurry compositions of the present invention comprise nano-sized silicon carbide abrasive particles. In certain embodiments, the silicon carbide abrasive particles behave similarly to silica, as set forth herein. For example, the silicon carbide particles can have a surface chemistry similar to silica such that the silicon carbide particles behave similarly to silica. As a result, the particles are very compatible with all abrasive slurry chemistries formulated around silica abrasives such that the silicon carbide abrasive particles are easily dispersed in these slurry chemistries. In some embodiments, dispersion can be further facilitated by simply adjusting the pH of the slurry as required (e.g., above the isoelectric point of the silicon carbide particles, e.g. pH=3.0). Thus, the present silicon carbide particles will tend to be stable under conditions where silica particles would be stable, resulting in decreased agglomeration.

Without being bound by theory, it is believed that silicon carbide particles which have properties similar to silica enhances CMP and other polishing processes because the silica-like properties result in an electrochemical attack at the surface of the substrate (e.g. crystal, ceramic, or mineral substrate). The reacted layer can then more easily be removed by the abrasive nature of the particles. For example, it is believed that silicon carbide particles having a surface chemistry similar to silica and those having a silica coating provided on the outer surface of silicon carbide particles (as evidenced by the silica-like surface potential and iso-electric point) results in the coating or the surface chemistry electrochemically attacking the surface of the substrate (e.g. crystal, ceramic, or mineral substrate). In other words, the surface chemistry, "coating", or oxidized portion(s) of the silicon carbide particles, behaves like silica particles. The reacted layer can then more easily be removed by the abrasive nature of the particles.

The total amount of abrasive particles, which generally corresponds to the amount of silicon carbide particles, is generally at least about 0.01% by weight of the slurry. In some embodiments, the total amount of abrasive particles in the slurry is at least about 0.05%, at least about 0.1%, at least about 0.2%, at least about 0.3%, at least about 0.4%, at least about 0.5%, at least about 0.6%, at least about 0.7%, at least about 0.8%, at least about 0.9%, or at least about 1%. In some embodiments, the total amount of abrasive particles is at least about 2%, in some embodiments at least about 5%, and in some embodiments at least about 7%. In some embodiments, the total amount of abrasive particles in the slurry ranges from about 7% to about 40% by weight of the slurry, and in some embodiments from about 10% to about 50% by weight of the slurry. However, it is understood that the total amount of abrasive particles can be adjusted based on factors such as the surface being polished, the amount of silica "coating" on the silicon carbide particles, the level of surface chemistry of the silicon carbide similar to silica, and/or the level of silica properties possessed by the silicon carbide. Thus, for example, if more aggressive polishing is desired, the total amount of particles can be increased and/or the amount of silica "coating"/surface chemistry/silica properties can be adjusted while increasing, maintaining, or decreasing the total amount of particles. Further, polishing conditions (such as pressure and pH of the slurry) can also be adjusted to provide desired polishing properties.

In some embodiments, additional abrasive particles can be added to the silicon carbide slurries to form a composite slurry. The silicon carbide particles of the present invention can generally be used in combination with other particles wherever the slurry possesses a high pH (e.g. from about 7 to 12). In some embodiments, the particles used in combination with the present silicon carbide particles include, for example, silica (colloidal and fumed), alumina, and ceria. It is believed that the silicon carbide particles of the present invention, with iso-electric point <3.0, provide improved composite slurries as compared to other silicon carbide particles because their properties, such as surface chemistry (e.g. oxide layer), enable them to more readily dispersed in aqueous medium and, thus, will not settle or form agglomerates. Further, such particles provide an electrochemical attack on the surface of the substrate, thereby softening the surface of the substrate for abrasive/mechanical removal.

The thus formed silicon carbide abrasive particles are dispersed within an aqueous medium to form an abrasive slurry. The aqueous medium can contain any combination of conventional ingredients such as solvents, pH adjusters, chelating agents, lubricants, corrosion inhibitors, surface modifiers, inhibiting agents, rheology agents, oxidizing agents, and deionized water. As used herein, "dispersed" is understood to mean that the abrasive particles are distributed throughout the aqueous medium, preferably evenly distributed.

Rheology agent are generally included in abrasive slurries to increase the slurry viscosity and to structure the laminar flow of the slurry such that vertical fluid motion is reduced. Any conventional rheology agents can be used in the present slurry compositions, including, but not limited to, cross-linked acrylic polymers and water soluble polymers (WSPs). Some examples include modified cellulose derivatives, cellulose ethers, starch derivatives, pectin derivatives, polyacylamides, hydroxypropylcellulose, hydroxyethylcellulose, and carboxymethylcellulose.

Various oxidizing agents can be included in the slurry compositions. These agents generally include any substances which remove metal electrons and raise the atomic valence. Examples of oxidizing agents include, but are not limited to, hydrogen peroxide, urea hydrogen peroxide, monopersulfates, dipersulfates, peracetic acid, percarbonates, organic peroxides such as benzoyl peroxide, di-t-butyl peroxide, periodic acid, periodiate salts, perbromic acid, perbromate salts, perchloric acid, perchloric salts, perboric acid, perborate salts, permanganates, permanganate salts, hydroxylamine, ferric nitrate, and nitric acid.

Chelating agents can further be used. Such agents chemically react with metal ions removed from the polished/planarized surface to form a soluble metal complex to minimize re-deposition of metal ions on the surface of the substrate. Any conventional chelating agents can be used and include, for example, one or more amine or amide groups (e.g. ethylenediaminetetraacetic acid, ethylenediamine, and methylformamide) and organic acids (e.g. iminodiacetic acid and oxalic acid.

Various corrosion inhibitors can further be included in the compositions. These materials generally react with the fresh polished/planarized surface and/or oxidized surface to passivate the surface and prevent excessive etching of the surface during CMP. Any conventional corrosion inhibitors can be used, including, but not limited to, alkyl amines, imidazole, aminotetrazole, benzotriazole, mercaptobenzotriazole, 5-methyl-1-benzotriazole, benzimidazole, amino, imino, carboxy, mercapto, nitro, alkyl, urea and thiourea compounds and derivatives, etc. Dicarboxylic acids such as oxalic acid, malonic acid, succinic acid, nitrilotriacetic acid, iminodiacetic acid, and combinations thereof.

Various solvents conventionally used in abrasive slurries can further be included to provide a medium in which the abrasive is dispersed and in which the other components are incorporated. The solvents can be selected from any conventional solvents including, but not limited to, water, alcohols, such as isopropyl alcohol, methanol, ethanol, propanol, butanol, ethylene glycol, propylene glycol, glycerin, ketones, such as acetone, ethers, such as diethylether, tetrahydrofuran (THF), and water-alcohol solutions.

Surfactants can further be included in the abrasive slurries. Suitable surfactants include non-ionic, anionic, cationic, non-ionic, zwitterionic, amphoteric, and polyelectrolyte compounds. Examples of some surfactants for use in the present invention are disclosed in, for example, Kirk-Othmer, Encyclopedia of Chemical Terminology, 3rd Edition, Vol. 22 (John Wiley & Sons, 1983), Sislet & Wood, Encyclopedia of Surface Active Agents (Chemical Publishing Co., Inc. 1964), Ash, The Condensed Encyclopedia of Surfactants (chemical Publishing Co., Inc., 1989), Tadros, Surfactants (Academic Press, 1984), all of which are incorporated herein by reference. Some examples include salts of organic acids, alkane sulfates, alkane sulfonates, hydroxides, substituted amine salts, betaines, polyethylene oxide, polyvinyl alcohol, polyvinyl acetate, polyacrylic acid, polyvinyl pyrrolidone, polyethyleneinine, esters of anhydrosorbitols, quarternary such as tetramethyl ammonium halides, Cetyl trimethyl ammonium halides, nonyl ethers and combinations thereof.

The pH of the present abrasive slurry compositions may be at any suitable value that is efficacious for the specific polishing operation employed. To provide a desired pH value, one or more pH adjusting agents can further be included in the compositions. The pH adjusting agents can include, for example, any of various bases, such as potassium hydroxide (KOH), sodium hydroxide (NaOH) and ammonium hydroxide, or inorganic and/or organic acids, such as acetic acid, phosphoric acid, or oxalic acid.

In some embodiments, silicon carbide particles are formed by oxidation so as to provide coated particles having a particle size that does not change or does not change significantly as compared to the starting material (unoxidized material). Thus, the particle size is easily controllable.

The contents of all cited references (including literature references, issued patents, published patent applications) as cited throughout this application are hereby expressly incorporated by reference. The practice of the present invention will employ, unless otherwise indicated, conventional techniques, which are within the skill of the art. Such techniques are explained fully in the literature.

The present invention is further illustrated by the following examples which should not be construed as limiting in any way. The contents of all cited references (including literature references, issued patents, published patent applications) as cited throughout this application are hereby expressly incorporated by reference. The practice of the present invention will employ, unless otherwise indicated, conventional techniques, which are within the skill of the art. Such techniques are explained fully in the literature.

EXAMPLE

The composite slurry used for stock removal of materials (Ceramics, Plastics, Metals) includes of a mixture of two types of ultra fine particles, those of colloidal silica and silicon carbide, in an aqueous medium. The colloidal silica slurry grade is Bindzil 50/80 that is sourced from Eka Chemicals where the silica particle size is of the order of 40 nm with a concentration at 50% by weight in an aqueous medium that is alkaline with a pH of ~9.5 as described in their product literature. The silicon carbide slurry is an aqueous slurry containing a distribution of ultra fine silicon carbide particles in the range 87 nm-340 nm with a median particle size of 135 nm as measured on the Horiba LA 920 particle sizer.

The two aqueous slurries of silica and silicon carbide are blended and homogenized such that the total solids concentration is 30 wt %, of which silica is 21 wt % and silicon carbide 9 wt % with a pH in the range 9-9.5. The pH of the composite slurries can be adjusted down to 7 with a suitable acid depending on the polishing application.

Typically for stock removal, the test materials have a very rough surface finish coming in from a prior process such as lapping. The stock removal process utilizes slurry and a polishing machine to render the surface of the test material to a mirror finish.

For the case with silicon in this example, a 2" diameter sample was lapped to surface finish around 7000 Å. The stock removal performance of the composite slurry was bench marked against colloidal silica both containing the same amount of total solids of 30 wt % at a pH of 9.6.

The polishing was carried out on Buehler Ecomet 4 polisher under the following conditions where the pressure on the sample being polished was 4 psi. The platen speed on the polisher was 400 RPM (anti-clockwise) and the sample carrier speed was 70 RPM (clockwise). The polishing was carried out on a Suba H2 pad sourced from Rohm & Haas Electronic Materials with a slurry flow rate of 20 ml/min. Before the onset of polishing the sample weight was measured in grams up to four decimal places and the surface roughness was measured using an interferometer. The cumulative mass loss and surface finish of silicon was measured in 5 min intervals for both the stand alone colloidal silica slurry as well as the composite slurry as shown in Tables 1 and 2 below

TABLE 1

Cumulative Mass loss of Silicon- Composite slurry vs Colloidal Silica

| Time | CMR-ums-Comp Slurry | CMR-ums-C—SiO2 |
|---|---|---|
| 5 | 1.7 | 2.3 |
| 10 | 6.4 | 2.4 |
| 15 | 8.3 | 5.4 |
| 25 | 15.4 | 10.0 |

TABLE 2

Surface finish- Composite slurry vs Colloidal Silica

| Time | Ra(A)-Comp Slurry | Ra (A)-C—SiO2 |
|---|---|---|
| 0 | 7102 | 6899 |
| 5 | 1040 | 1395 |
| 10 | 363 | 740 |
| 15 | 219 | 322 |
| 25 | 8.3 | 72 |

Figure 4:
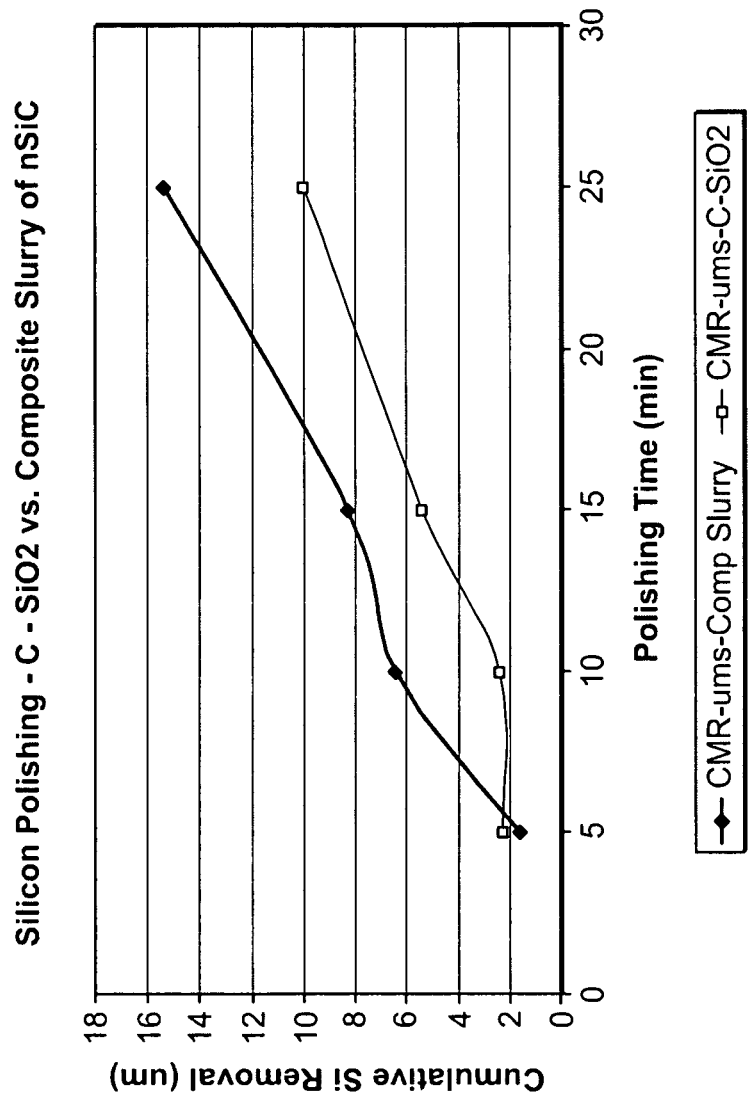
FIG. 4 demonstrates the cumulative mass loss and surface finish of a silicon substrate using a composite slurry vs. a colloidal silica slurry in accordance with the Example set forth herein.

As can be seen from the data tables, the performance of the composite slurry is superior in reducing the time required to obtain a given surface finish along with higher cumulative material removal relative to colloidal silica. This data is also shown in FIG. 4.

In another experiment with silicon, stock removal polishing under the same polishing parameters mentioned above, the material removal in 30 min of polishing with the composite slurry is higher by 49% relative to that of colloidal silica alone as shown in Table 3.

TABLE 3

Silicon Material Removal- Composite slurry vs Colloidal Silica Continuous Polishing

| Slurry | 30 min-MR (um) |
|---|---|
| Colloidal Silica-30 Wt %-pH 9.6 | 11.4 |
| Composite Slurry-nSiC-30 Wt %-pH 9.6 | 17 |

Similar improvements were demonstrated with other materials such as polyimides, polycrystalline aluminum nitrides etc.

What is claimed is:

1. Abrasive particles comprising silicon carbide having an average particle size of less than 200 nm and a particle size distribution from 87 nm to 340 nm and a silica coating covering a portion of their surface, wherein the abrasive particles have an oxygen content ranging from 5 wt % to 20 wt % based on the total weight of the particle, a surface potential similar to silica, and remain dispersed in an aqueous medium having a pH from 8 to 12.

2. The abrasive particles of claim 1 wherein the silicon carbide particles comprise particles having silica covering at least 50% of the surface of the abrasive particles.

3. The abrasive particles of claim 1 wherein the silicon carbide particles comprise particles having silica covering at least 80% of the surface of the abrasive particles.

4. The abrasive particles of claim 1 wherein the silicon carbide particles are substantially encapsulated by silica.

5. The abrasive particles of claim 1, wherein the silicon carbide particles have an average particle size of 100 nm or less.

6. The abrasive particle of claim 1 wherein the silica coating is formed by thermal oxidation, chemical oxidation, or combinations thereof of the silicon carbide particles.

7. The abrasive particles of claim 1 wherein the oxidation results in particles of silicon carbide comprising a silica coating having a particle size that has not changed more than 15% of the particle size of the silicon carbide particles before oxidation.

8. The abrasive particles of claim 1 wherein the silicon carbide is α-silicon carbide or β-silicon carbide.

9. An abrasive slurry composition comprising a dispersion of silicon carbide particles in accordance with claim 1.

10. The abrasive slurry composition of claim 9 wherein the silicon carbide is present in the aqueous medium at a concentration of at least about 0.01 wt %.

11. The abrasive slurry composition of claim 9 wherein the silicon carbide is present in the aqueous medium at a concentration of at least about 0.1 wt %.

12. The abrasive slurry composition of claim 9 wherein the silicon carbide is present in the aqueous medium at a concentration of at least about 1 wt %.

13. The abrasive slurry composition of claim 9 wherein the silicon carbide is present in the aqueous medium at a concentration ranging from about 5% to about 50%.

* * * * *